(12) United States Patent
Yang et al.

(10) Patent No.: US 12,040,983 B2
(45) Date of Patent: Jul. 16, 2024

(54) SYSTEMS AND METHODS TO MEASURE THE NUMBER OF PACKETS IN CUPS

(71) Applicant: Telefonaktiebolaget LM Ericsson (publ), Stockholm (SE)

(72) Inventors: Yong Yang, Kållered (SE); Erik Wikström, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 17/634,261

(22) PCT Filed: Aug. 17, 2020

(86) PCT No.: PCT/IB2020/057725
§ 371 (c)(1),
(2) Date: Feb. 10, 2022

(87) PCT Pub. No.: WO2021/028890
PCT Pub. Date: Feb. 18, 2021

(65) Prior Publication Data
US 2022/0329530 A1 Oct. 13, 2022

Related U.S. Application Data

(60) Provisional application No. 62/887,360, filed on Aug. 15, 2019.

(51) Int. Cl.
*H04L 47/2408* (2022.01)
*H04L 43/0894* (2022.01)
(Continued)

(52) U.S. Cl.
CPC ...... *H04L 47/2408* (2013.01); *H04L 43/0894* (2013.01); *H04L 45/26* (2013.01); *H04W 24/08* (2013.01); *H04W 28/10* (2013.01)

(58) Field of Classification Search
CPC . H04L 47/2408; H04L 43/0894; H04L 45/26; H04L 12/1403; H04L 12/1407;
(Continued)

(56) References Cited

U.S. PATENT DOCUMENTS 6,292,481 B1    9/2001  Voit et al.
9,438,497 B2 *  9/2016  Chan ...................... H04L 43/12
(Continued)

FOREIGN PATENT DOCUMENTS

CN   109314710 A    2/2019
CN   109845300 A    6/2019
WO   2018142021 A1  8/2018

OTHER PUBLICATIONS

Author Unknown, "Technical Specification Group Services and System Aspects; Architecture enhancements for control and user plane separation of EPC nodes; Stage 2 (Release 16)," Technical Specification 23.214, Version 16.0.0, Jun. 2019, 3GPP Organizational Partners, 92 pages.
(Continued)

*Primary Examiner* — Abdullahi Ahmed
(74) *Attorney, Agent, or Firm* — Withrow & Terranova, PLLC

(57) ABSTRACT

Systems and methods to measure the number of packets in Control/User Plane Separation, CUPS, are provided. In some embodiments, a method performed by a Control Plane, CP, entity includes: determining that packet counting should be performed by a User Plane, UP, entity; providing measurement instructions to the UP entity for counting packets and identifying a recipient of a packet count if the CP entity is not the recipient; and, if the CP entity is the recipient of the packet count, receiving, from the UP entity, a packet count. In this way, a CP function is able to instruct a UP
(Continued)

function to perform a measurement in terms of packets, e.g., a measurement of the number of packets transmitted.

38 Claims, 12 Drawing Sheets

(51) Int. Cl.
*H04L 45/00* (2022.01)
*H04W 24/08* (2009.01)
*H04W 28/10* (2009.01)

(58) Field of Classification Search
CPC ....... H04W 24/08; H04W 28/10; H04W 4/24; H04M 15/00; H04M 15/66
See application file for complete search history.

(56) References Cited

U.S. PATENT DOCUMENTS

| | | | |
|---|---|---|---|
| 2002/0006780 | A1 | 1/2002 | Bjelland et al. |
| 2010/0142373 | A1 | 6/2010 | Jin et al. |
| 2015/0256466 | A1* | 9/2015 | Roitshtein ........... H04L 47/2483 709/234 |
| 2019/0394712 | A1* | 12/2019 | Rönneke ................. H04W 4/70 |
| 2021/0218849 | A1* | 7/2021 | Cai ..................... H04M 15/775 |
| 2021/0314747 | A1* | 10/2021 | Yang .................... H04L 12/1407 |
| 2022/0200866 | A1* | 6/2022 | Holmström ........... H04W 28/24 |
| 2023/0300943 | A1* | 9/2023 | Wang ................ H04M 15/8228 370/329 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.3.0, Jun. 2019, 3GPP Organizational Partners, 423 pages.
Author Unknown, "Technical Specification Group Core Network and Terminals; Interface between the Control Plane and the User Plane Nodes; Stage 3 (Release 14)," Technical Specification 29.244, Version 14.6.0, Dec. 2018, 3GPP Organizational Partners, 172 pages.
Author Unknown, "Technical Specification Group Core Network and Terminals; Interface between the Control Plane and the User Plane Nodes; Stage 3 (Release 16)," Technical Specification 29.244, Version 16.0.0, Jun. 2019, 3GPP Organizational Partners, 217 pages.
Author Unknown, "Technical Specification Group Services and System Aspects; Telecommunication management; Charging management; Diameter charging applications (Release 16)," Technical Specification 32.299, Version 16.1.0, Jun. 2019, 3GPP Organizational Partners, 207 pages.
Ericsson, et al., "C4-193678: Number of packets," Change Request, 3GPP TSG-CT WG4 Meeting #93, Aug. 26-Aug. 30, 2019, Wroclaw, Poland, 16 pages.
Ericsson, et al., "C4-193abc: Support 5G VN Group Communication," Change Request, 3GPP TSG-CT WG4 Meeting #93, Aug. 26-30, 2019, Wroclaw, Poland, 15 pages.
Huawei, et al., "S2-186280: Update of N4 Parameter Descriptions and Tables," 3GPP TSG-SA2 Meeting #127 Bis, May 28-Jun. 1, 2018, Newport Beach, California, 9 pages.
International Search Report and Written Opinion for International Patent Application No. PCT/IB2020/057725, mailed Nov. 12, 2020, 24 pages.
Examination Report for Indian Patent Application No. 202247012742, mailed Aug. 2, 2022, 6 pages.
Author Unknown, "Technical Specification Group Services and System Aspects; Architecture enhancements for control and user plane separation of EPC nodes; Stage 2 (Release 14)," Technical Specification 23.214, Version 14.3.0, Jun. 2017, 3GPP Organizational Partners, 78 pages.
First Office Action for Chinese Patent Application No. 202080072095.1, mailed Aug. 31, 2023, 10 pages.
Examination Report for European Patent Application No. 20761902.4, mailed Feb. 10, 2023, 9 pages.
Intention to Grant for European Patent Application No. 20761902.4, mailed Jun. 29, 2023, 8 pages.

\* cited by examiner

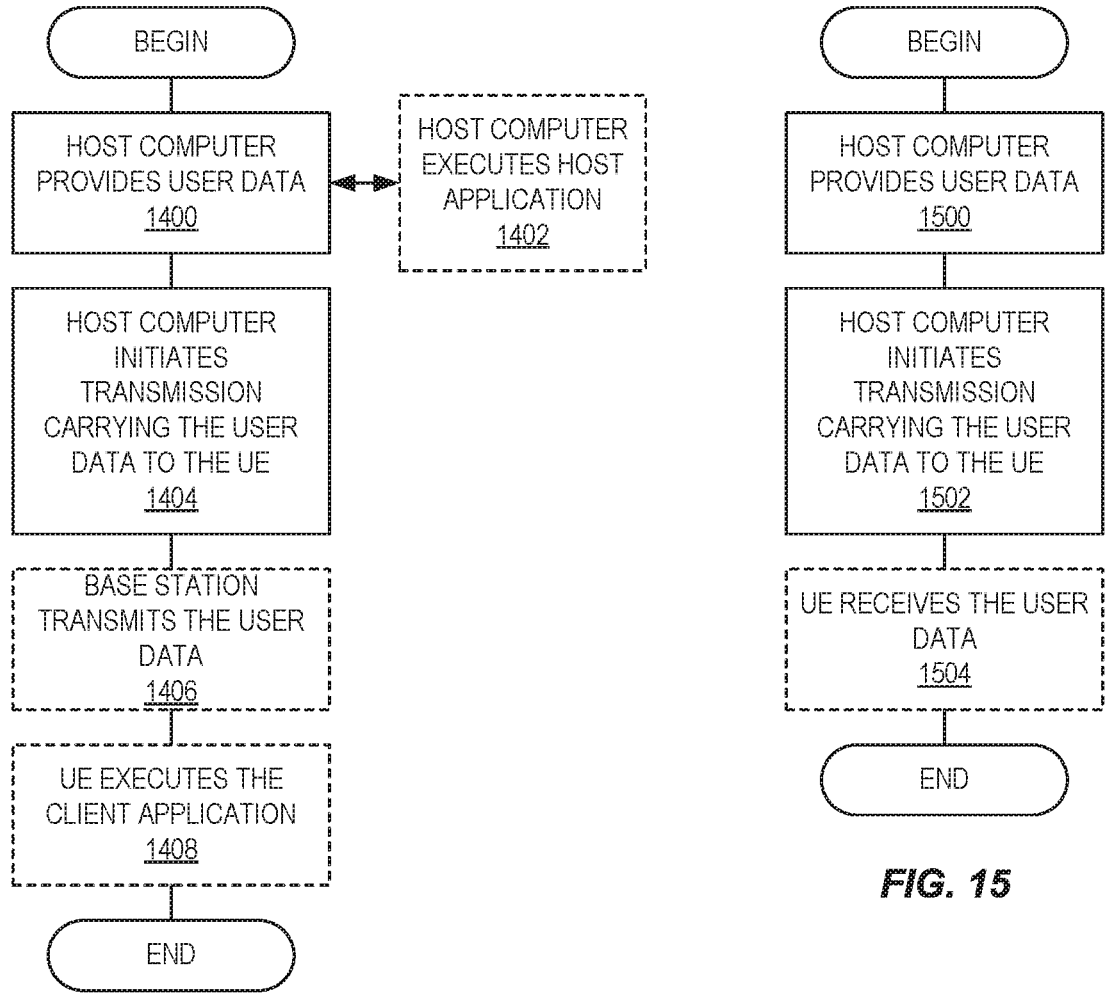

SYSTEMS AND METHODS TO MEASURE THE NUMBER OF PACKETS IN CUPS

RELATED APPLICATIONS

This application is a 35 U.S.C. § 371 national phase filing of International Application No. PCT/IB2020/057725, filed Aug. 17, 2020, which claims the benefit of provisional patent application Ser. No. 62/887,360, filed Aug. 15, 2019, the disclosures of which are hereby incorporated herein by reference in their entireties.

TECHNICAL FIELD

The present disclosure relates to measuring packets.

BACKGROUND

When Control/User Plane Separation (CUPS) was introduced by the Third Generation Partnership Project (3GPP), to support Charging and Policy Control functions, the Control Plane (CP) function needed to provision Usage Reporting Rules (URRs) to instruct the User Plane (UP) function, for a given Packet Forwarding Control Protocol (PFCP) session, to measure the network resources usage in terms of traffic data volume, duration (i.e., time) and/or events. This is specified in sub-clause 5.2.2 of 3GPP Technical Specification (TS) 29.244, Version 16.0.0, "Usage Reporting Rule handling":

Begin Excerpt from 3GPP TS 29.244

5.2.2 Usage Reporting Rule Handling
5.2.2.1 General

The CP function shall provision URR(s) for an Sx session in an Sx Session Establishment Request or an Sx Session Modification Request to request the UP function to:
  measure the network resources usage in terms of traffic data volume, duration (i.e. time) and/or events, according to the provisioned Measurement Method; and
  send a usage report to the CP function, when the measurement reaches a certain threshold, periodically or when detecting a certain event, according to the provisioned Reporting Triggers.

NOTE: The UP function sends a usage report without performing network resources usage measurements when being requested to detect and report the the start of an SDF or application traffic.

5.2.2.2 Provisioning of Usage Reporting Rule in the UP function

When provisioning a URR, the CP function shall provide the reporting trigger(s) in the Reporting Triggers IE of the URR which shall cause the UP function to generate and send a Usage Report to the CP function. When adding or removing reporting trigger(s) to or from the URR, the CP function shall provide the new complete list of applicable reporting triggers in the Reporting Triggers IE in the Sx Session Modification Request message.

For the volume-based measurement method, the CP function may provision:
  the Volume Threshold IE, to request the UP function to generate a usage report when the measured traffic reaches the threshold;
  the Volume Quota IE, to request the UP function to stop forwarding packets and, if no Volume Threshold is provisioned, to also generate a usage report, when the measured traffic reaches the quota;
  the Dropped DL Traffic Threshold IE, to request the UP function to generate a usage report when the downlink traffic that is being dropped reaches the threshold; and/or
  NOTE 1: The Dropped DL Traffic Threshold can be armed in a SGW-U for triggering the PGW Pause of Charging feature (see 3GPP TS 23.401 [14]).
    a Measurement Information with the 'Measurement Before QoS Enforcement' flag set to 1, to request the UP function to measure the traffic usage before any QoS enforcement.

For the time-based measurement method, the CP function may provision:
  a Time Threshold IE, to request the UP function to generate a usage report when the measured traffic reaches the threshold;
  a Time Quota, to request the UP function to stop forwarding packets and, if no Time Threshold is provisioned, to also generate a usage report, when the measured traffic reaches the quota; and/or
  an Inactivity Detection Time, to request the UP function to suspend the time measurement when no packets are received during the provisioned inactivity detection time. The time measurement shall then be resumed by the UP function when subsequent traffic is received. If an Inactivity Detection Time value of zero is provided, or if no Inactivity Detection Time has been provided by the CP function, the time measurement shall be performed continuously from the point when the first packet is received until the time-based usage measurement is stopped.

The CP function may provision a Volume Threshold, a Volume Quota, or both (and/or respectively a Time Threshold, a Time Quota, or both).

When both a Volume (or Time) Threshold and a Volume (or Time) Quota are provisioned, the UP function shall send a usage report only when reaching the Volume (or Time) Threshold; when subsequently reaching the Volume (or Time) Quota, the UP function shall stop forwarding packets without sending a new usage report to the CP function.

NOTE 2: For online charging, the Volume Threshold (or Time Threshold) can be set in a PGW-U or TDF-U to the value of the granted volume (or time) quota minus the volume (or time) quota threshold, such as to get a usage report from the UP function when the volume (or time) based credit falls below the remaining quota thresholds provided by the OCS.

NOTE 3: The Volume Quota or Time Quota can be armed in a PGW-U or TDF-U for online charging to enable the traffic to be forwarded up to an intermediate or final quotas granted by the OCS. The CP function can provision both a Volume (or Time) Threshold and a Volume (or Time) Threshold to request the UP function to send a usage report when the consumed resources reach the volume (or time) usage threshold provided by the OCS, and to stop forwarding packets (without sending a second usage report) when the granted volume (or time) quota is exhausted.

For all the measurement methods (i.e. volume, time or event), the CP function may also provision:
  a Quota Holding Time, to request the UP function to send a usage report and to also stop forwarding packets when no packets have been received for the duration indicated in this parameter;

NOTE 4: A Quota Holding Time can be armed in a PGW-U or TDF-U for online charging to request the UP function to send a Usage Report when the Quota Holding Time provided by the OCS (see 3GPP TS 32.299 [18])

expires. The UP function can be instructed in the same Usage Reporting Rule with the Report Triggers—START to generate a new Usage Report upon receiving any subsequent packets associated with this URR.

a Monitoring Time, to request the UP function to measure the network resources usage before and after the monitoring time in separate counts and to re-apply the volume and time thresholds at the monitoring time. The CP function may additionally provision a Subsequent Volume (or Time) Threshold IE, for a volume (or time) based measurement. When being provisioned with a Monitoring Time, the UP function shall:

reset its usage thresholds at the monitoring time to the value provided in the Subsequent Volume (or Time) Threshold IE, if provisioned in the URR, or to the remaining value of the Volume (or Time) threshold used before the monitoring time (i.e. excluding the already accumulated volume or time usage);

shall indicate the usage up to the Monitoring time and usage after the Monitoring time in the first usage report after the Monitoring Time is reached;

a Measurement Period, indicating the period to generate periodic usage reports to the CP function.

The CP function may request at any time the UP function to activate or deactivate a network resources usage measurement and the sending of corresponding Usage Reports, using the Inactive Measurement flag of the Measurement Information IE of the URR.

NOTE 5: This can be used in a PGW-U for the PGW Pause of Charging procedure (see 3GPP TS 23.401 [14]).

5.2.2.3 Reporting of Usage Report to the CP Function

When detecting that a provisioned reporting trigger occurs, the UP function shall generate a Usage Report and send it to the CP function by initiating the Sx Session Report procedure.

When providing usage report information in a message, the UP function shall include the UR-SEQN (Usage Report Sequence Number) identifying the order in which a Usage Report is generated for a given URR. The UR-SEQN (Usage Report Sequence Number) shall be incremented for every Usage Report generated by the UP function for the URR.

The UP function shall continue to apply the provisioned URR(s) and perform the network resources usage measurement after a threshold is reached, and re-apply the provisioned threshold (for sending any further Usage Report) until getting any further instruction or a new threshold from the CP function. The UP function shall reset its ongoing measurement counts when generating a usage report towards the CP function, i.e., the UP function shall report in a usage report the network resources usage measurement since the last usage report.

When receiving a new threshold or quota from the CP function for a measurement that is already ongoing in the UP function, the UP function shall consider its ongoing measurements counts against the new threshold or quota to determine when to send its next usage report to the CP function.

NOTE 1: The UP function determines when to send its next usage report to the CP function by deducting from the newly provisioned threshold or quota the traffic it has forwarded since its last usage report. As an example, if the UP function has forwarded 10 Mbytes of traffic since it last usage report to the CP function and the CP function provisions a new volume threshold or quota of 100 Mbytes, the UP function sends its next usage report upon forwarding an additional 90 Mbytes traffic.

When reporting the network resources usage before and after a Monitoring Time, the UP function shall send two Usage Reports in the PFCP message (e.g. Sx Session Report Request) for the same URR ID. Each Usage Report shall then include the Usage Information IE indicating whether the reported network resource usage was consumed before or after the Monitoring Time. Omission of this IE in a Usage Report indicates that no monitoring time has occurred. The UP function shall send Usage Reports soon after the occurrence of the Monitoring Time.

NOTE 2: The UP function needs to take care to smooth the signalling load towards the CP function if Usage Reports need to be generated for a large number of Sx sessions after the occurrence of the Monitoring Time.

For the volume-based measurement method, the UP function shall report the traffic usage after any QoS enforcement. Additionally, if the CP function requested to measure the traffic usage before QoS enforcement, the UP function shall also report corresponding measurements, when measurements needs to be reported for the traffic usage after QoS enforcement, by sending two Usage Reports in the PFCP message (e.g. Sx Session Report Request) for the same URR ID. Each Usage Report shall then include the Usage Information IE indicating whether the reported network resource usage corresponds to the traffic before or after QoS enforcement. Thresholds provisioned in a URR shall apply to the traffic usage after any QoS enforcement.

When being instructed to deactivate a network resources usage measurement, via the Inactive Measurement flag of the Measurement Information IE of the URR, the UP function shall include a Usage Report in the Sx Session Modification Response and reset its ongoing measurements for the URR that is deactivated.

The CP function may request the UP function, in an Sx Session Modification Request, to report its ongoing network resources measurement for one or multiple URRs of the Sx session. In this case, the UP function shall reset its ongoing measurements for the URR(s) being queried and include corresponding usage report(s) in the Sx Session Modification Response.

NOTE 3: It is up to the CP function to request the UP function to generate an immediate report (or not) as specified above when the CP function modifies a URR or any other rules of the Sx session. As an exception, the UP function always generates an immediate report when being instructed to deactivate a network resource measurement via the Inactive Measurement flag of the Measurement Information IE of the URR.

At the Sx session termination, the UP function shall indicate to the CP function, in the Sx Session Deletion Response, the resources that have been consumed for each URR that was provisioned in the Sx session since the last usage report (respective to each URR).

Upon receiving the Usage Report from the UP function, the CP function may initiate Sx Session Modification procedure as result of the communication with the PCRF or OCS, as described in subclause 5.3 of 3GPP TS 23.214 [2], e.g. by:

modifying the URR (e.g. changing the Volume/Time threshold, Volume/Time quota, disabling the usage monitoring);

creating a new FAR (e.g. for redirect) and/or modifying the existing FAR; or modifying the QER (s) in the Sx session.

5.2.2.4 Reporting of Linked Usage Reports to the CP Function

The CP function may instruct the UP function to generate a Usage Report for a URR "X" when a Usage Report is generated for another URR "Y", by:

provisioning the URR "X" with the Reporting Triggers IE set to Linked Usage Reporting; and including in the URR "X" the Linked URR ID IE set to the URR ID of the URR "Y".

NOTE: This can be used by the CP function e.g. to request the UP function to report a Usage Report for an SDF (i.e. URR "X") when the UP function reports a Usage Report for a bearer (i.e. URR "Y").

When a usage report is to be generated for the URR "Y", the UP function shall also send a Usage Report for the URR "X" with the accumulated usage information, and the Usage Report Trigger IE set to Linked Usage Reporting. The URR "Y" may be linked to more URRs than just URR "X".

End Excerpt from 3GPP TS 29.244

Improved systems and methods for usage reporting are needed.

SUMMARY

Systems and methods to measure the number of packets in Control/User Plane Separation (CUPS) are provided. In some embodiments, a method performed by a Control Plane (CP) entity includes: determining that packet counting should be performed by a User Plane (UP) entity; providing measurement instructions to the UP entity for counting packets and identifying a recipient of a packet count if the CP entity is not the recipient; and, if the CP entity is the recipient of the packet count, receiving, from the UP entity, a packet count. In this way, a CP function is able to instruct a UP function to perform a measurement in terms of packets, e.g., a measurement of the number of packets transmitted.

Certain aspects of the present disclosure and their embodiments may provide solutions to the aforementioned or other challenges. The present disclosure proposes a mechanism in Evolved Packet Core (EPC) and Fifth Generation Core (5GC) to enable a CP entity to instruct a UP entity to perform measurement network resource usage in number of packets for a PDU session/PDN connection or one or more of the service data flow. A CP entity may also be referred to herein as a CP function. A UP entity may also be referred to herein as a UP function. Examples of CP entities include, but are not limited to, an Mobility Management Entity (MME) in EPC and a Session Management Function (SMF) in 5G. Examples of UP entities include, but are not limited to, a Signaling Gateway-U (SGW-U), Packet Data Gateway-U (PGW-U) in 4G Evolved Packet systems and a User Plane Function (UPF) in 5G systems.

A CP or UP function can be implemented either as a network element on a dedicated hardware, such as a node, as a software instance running on a dedicated hardware, or as a virtualized function instantiated on an appropriate platform, e.g., on a cloud infrastructure.

There are, proposed herein, various embodiments which address one or more of the issues disclosed herein. Certain embodiments may provide one or more of the following technical advantage(s). The present disclosure provides a protocol mechanism to enable a CP function to instruct a UP function to perform a measurement in terms of packets, e.g., a measurement of the number of packets transmitted.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 14 through 17 are flowcharts illustrating methods implemented in a communication system, according to some embodiments of the present disclosure.

DETAILED DESCRIPTION

Figure 1:
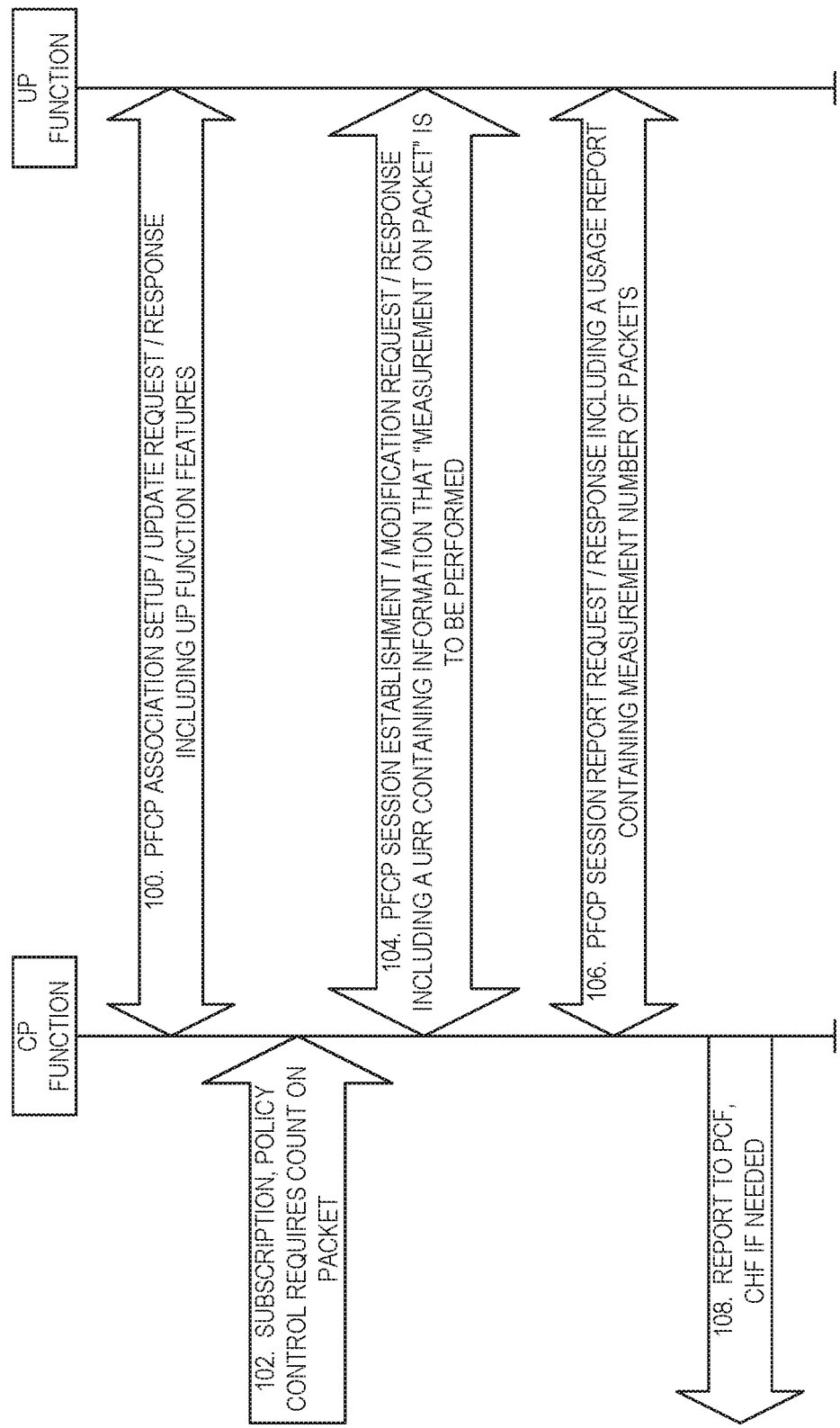
FIG. 1 illustrates an example interaction between a Control Plane (CP) function and a User Plane (UP) function in accordance with the subject matter of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

CP or UP Function: A function in a network, which has a defined functional behavior and defined interfaces.

Note that a network function can be implemented either as a network element on a dedicated hardware, as a software instance running on a dedicated hardware, or as a virtualised function instantiated on an appropriate platform, e.g., on a cloud infrastructure.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The existing usage reporting includes only measurement in octets, time (seconds), and events. However, the counting number of packets transferred in Uplink and/or Downlink and/or Total for a Protocol Data Unit (PDU) session or a Packet Data Network (PDN) connection is required, since it is useful information to derive a proper traffic model in the mobile network which is vital when it comes to dimensioning and deployment. In addition, counting the number of packets may be especially useful for some Cellular Internet of Things (CIoT)-related services since many those services are charged per packet Certain aspects of the present disclosure and their embodiments may provide solutions to the aforementioned or other challenges. The present disclosure proposes a mechanism in Evolved Packet Core (EPC) and Fifth Generation Core (5GC) to enable a Control Plane (CP) entity to instruct a User Plane (UP) entity to perform measurement network resource usage in number of packets for a PDU session/PDN connection or one or more of the service data flow. A CP entity may also be referred to herein as a CP function. A UP entity may also be referred to herein as a UP function. Examples of CP entities include, but are not limited to, an Mobility Management Entity (MME) in EPC and a Session Management Function (SMF) in 5G. Examples of UP entities include, but are not limited to, a Signaling Gateway-U (SGW-U), Packet Data Gateway-U (PGW-U) in 4G Evolved Packet systems and a User Plane Function (UPF) in 5G systems.

A CP or UP function can be implemented either as a network element on a dedicated hardware, such as a node, as a software instance running on a dedicated hardware, or as a virtualized function instantiated on an appropriate platform, e.g., on a cloud infrastructure.

There are, proposed herein, various embodiments which address one or more of the issues disclosed herein. Certain embodiments may provide one or more of the following technical advantage(s). The present disclosure provides a protocol mechanism to enable a CP function to instruct a UP function to perform a measurement in terms of packets, e.g., a measurement of the number of packets transmitted.

FIG. 1 illustrates an example interaction between a CP function and a UP function in accordance with the subject matter of the present disclosure.

At step 100, the CP function and the UP function exchange PFCP messages for the purpose of setting up or updating a PFCP association. This process involves interactions that include requests and responses. During this step, the CP function may receive, from the UP function, an indication that packet counting is supported.

At step 102, the CP function receives an indication that packet counting is required. This indication may be conveyed as part of a User Equipment (UE) subscription information or a policy control message.

At step 104, a PFCP session establishment or modification request or response message includes a URR that indicates that "measurement on packet" is to be performed.

At step 106, a PFCP session report request or response message includes a usage report containing a measurement of the number of packets.

At step 108, the CP function sends a report to a Policy Control Function (PCF) or Charging Function (CHF) if needed.

Figure 2:
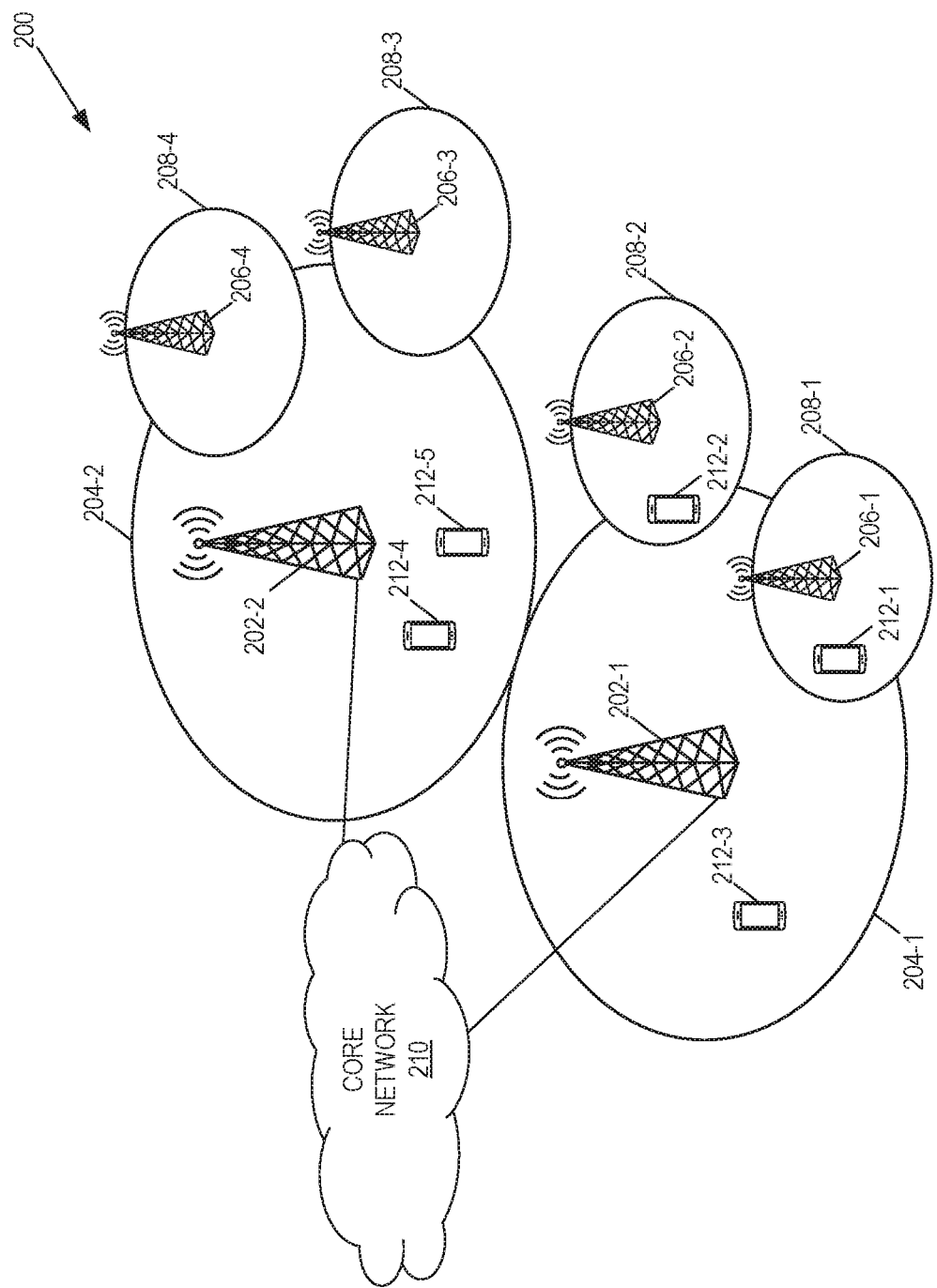
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a NR Radio Access Network (RAN) or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
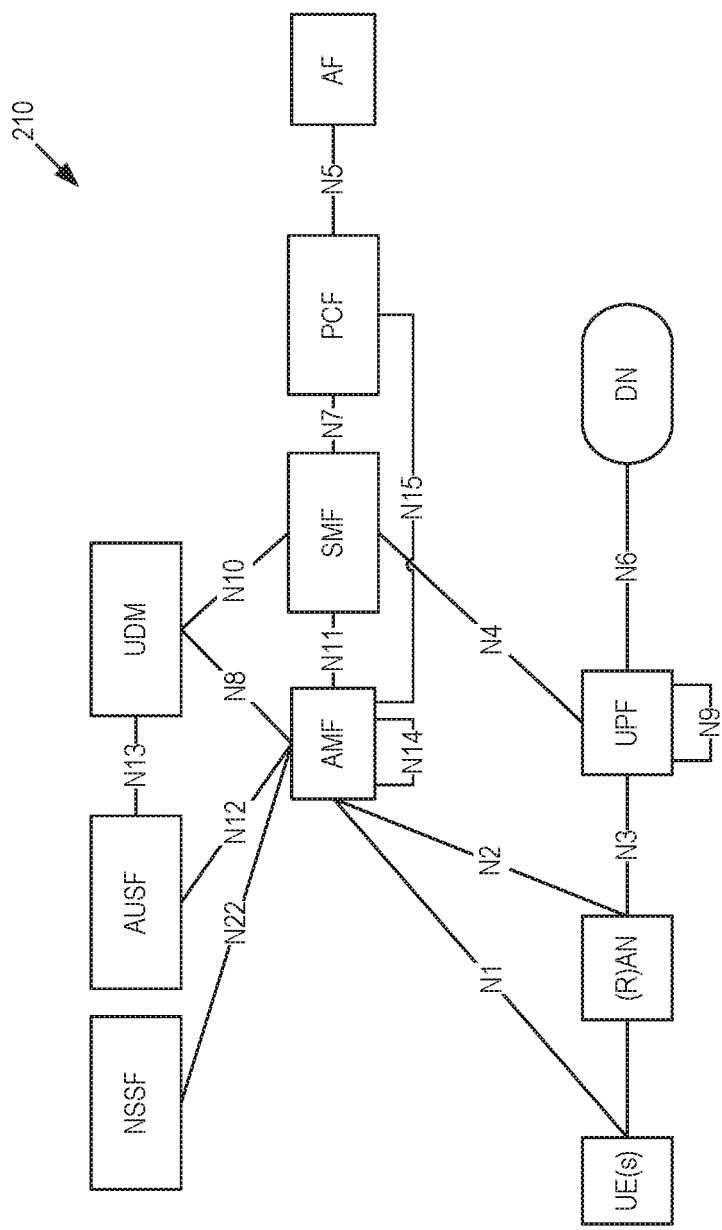
FIG. 3 illustrates a wireless communication system represented as a 5G network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 3 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
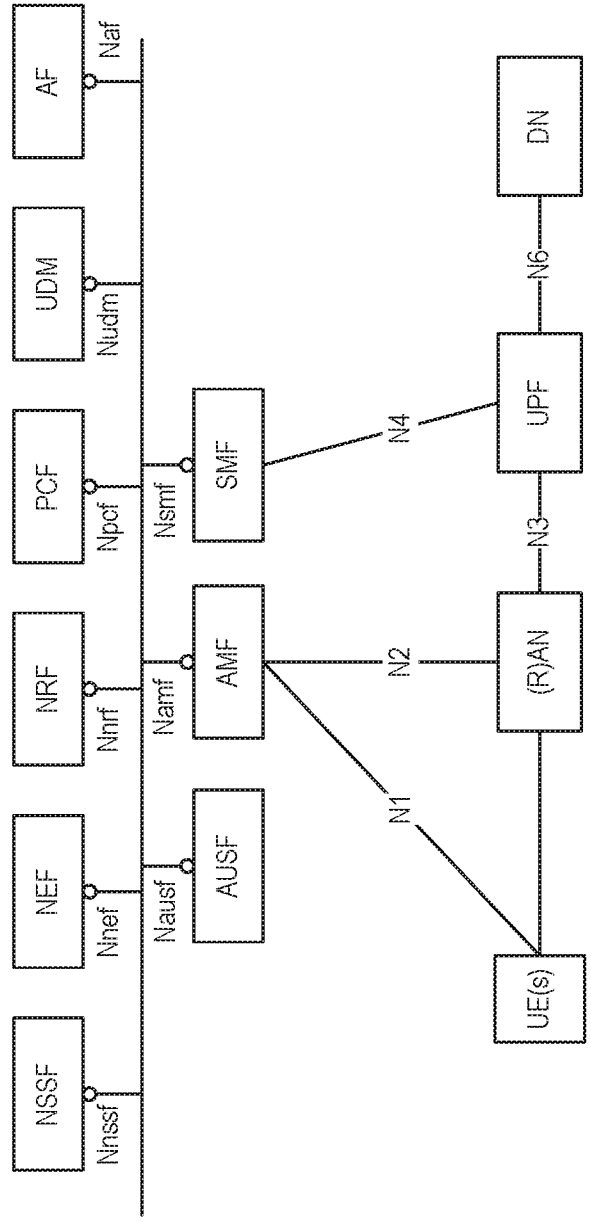
FIG. 4 illustrates a 5G network architecture using service-based interfaces between the NFs in the control plane, instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The present disclosure proposes a mechanism in EPC and 5GC to enable the CP function to instruct the UP function to perform measurement network resource usage in number of packets for a PDU session/PDN connection or one of service data flow.

Figure 5:
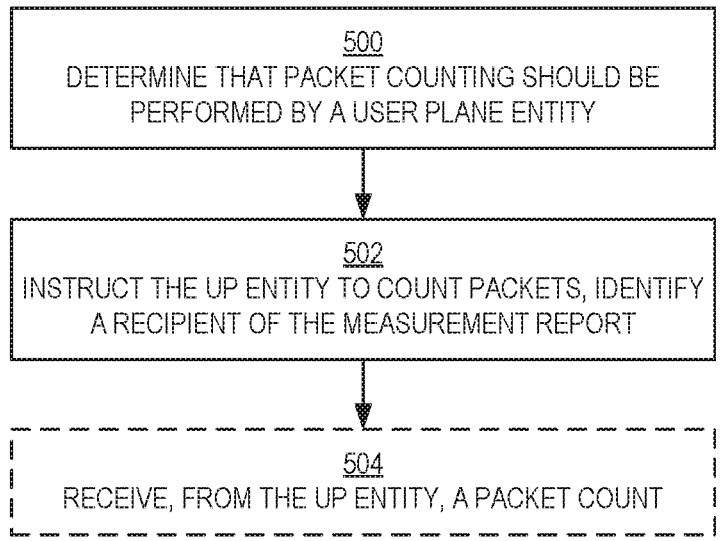
FIG. 5 illustrates a method for providing instructions to measure the number of packets in Control/User Plane Separation (CUPS) according to some embodiments of the present disclosure.

FIG. 5 illustrates a method for providing instructions to measure the number of packets in Control/User Plane Separation (CUPS) according to some embodiments of the present disclosure. In the embodiment illustrated in FIG. 5, the method includes performing the following steps at a CP function: determine that packet counting should be performed by a UP entity (step 500); instruct the UP entity to count packets and identify a recipient of the measurement report (step 502); and, if the CP function is the identified recipient, receive, from the UP entity, a measurement report that comprises a packet count (step 504). As used herein, a measurement report may also be referred to as a usage report or a packet count report. The packet count comprised in the usage report/measurement report corresponds to the measured packet counts by the UP entity in accordance with the instructions provided by the CP entity (i.e., packet count for the UE, APN/DNN, PDU session/PDN connection, Service data flow or application, in addition, the packet count is provided for DL, UL and/or total.

Determining that packets should be counted.

There are a number of ways that a CP entity may determine according to embodiments of the present disclosure that packet counting should be performed, including, but not limited to, the following examples.

The CP function determines that the UP function can perform packet counting. The CP function can make such determination when it establishes a Packet Flow Control Protocol association or similar association with the UP function. During establishment of the PFCP association, the CP entity receives from the UP function an indication that packet count measurement feature e.g., Measure Number Of Packets (MNOP) or similar, is supported and that packet count measurements could be performed on the UL, DL, and/or Total Packet count for a UE, a PDU session/PDN connection, APN/DNN, or for a service data flow. In addition, the UP function may also indicate its ability to provide packet count with or without octet count.

UE or subscription driven: in some embodiments, the CP function determines that packet counting should be performed by receiving subscription information for a User Equipment, UE, the subscription information comprising an indication that packet counting should be performed for an identified Data Network Name (DNN) or Access Point Name (APN), or a PDU session or PDN connection associated with an established PFCP session, or for an application. In some embodiments, the CP entity receives the subscription information from a Unified Data Management (UDM) entity, a Home Subscriber Server (HSS), or an Authentication, Authorization, and Access (AAA) server.

PCF driven: in some embodiments, determining that packet counting should be performed comprises receiving, from a Policy [and charging] Control Function, PCF, a policy rule indicating that packet counting should be performed for certain types of traffic, such as for an identified service data flow.

CP driven: in some embodiments, determining that packet counting should be performed comprises determining that a configuration of the CP function indicates to the UPF the need to report the number of packets forwarded for a UE, PDN connection/PDU session, APN/DNN, per application or per service data flow. The packet count may be performed for the UL/DL or both. The CP function may also indicate if both packet count and octet count measurements should be reported.

Instructing the UP Entity.

There are a number of ways that a CP entity according to embodiments of the present disclosure may instruct the UP entity to count packets, including, but not limited to, the following examples:

In some embodiments, instructing the UP entity to count packets comprises provisioning the UP entity with a Usage Report Rule (URR) or Packet Detection Rules (PDRs) in 5G, comprising information identifying packets to be counted.

The information identifying packets to be counted comprises information identifying a UE, a PDU session, a PDN connection, and/or a service data flow for which packet count is to be performed.

The information identifying packets to be counted may indicate whether UL packets, DL packets, or both UL and DL packets (total packets) for the PDU session/PDN connection and/or service data flow should be counted.

In some embodiments, instructing the UP entity to count packets comprises sending an instruction (such as a flag or flags) that is included in an IE that conveys measurement information. For example, a flag indicates that the measurement method is to count packets. Alternatively, a flag can indicate whether packet count or octet count or both measurements should be performed.

In some embodiments, instructing the UP entity to count packets further comprises providing a reporting trigger based on a packet count threshold.

In addition the UP function may be instructed as part of the URRs or PDRs to send the usage reports to report the packet count to an alternative destination (alternative CP function) which may or may not be the same destination as the destination that receives the octet based measurement.

Receiving the Packet Count.

There are a number of ways according to embodiments of the present disclosure that a CP entity may receive a usage report from the UP entity and that comprises a packet count, including, but not limited to, the following examples:

In some embodiments, receiving the usage report comprises receiving the packet count within an existing IE that conveys volume measurement.

Alternatively, receiving the usage report comprises receiving the packet count within a new IE for that purpose, e.g., named "Packet Measurement" or similar.

The CP entity receiving the usage report may not be the same CP entity that provisioned the UP entity with URRs or PDRs.

Figure 6:
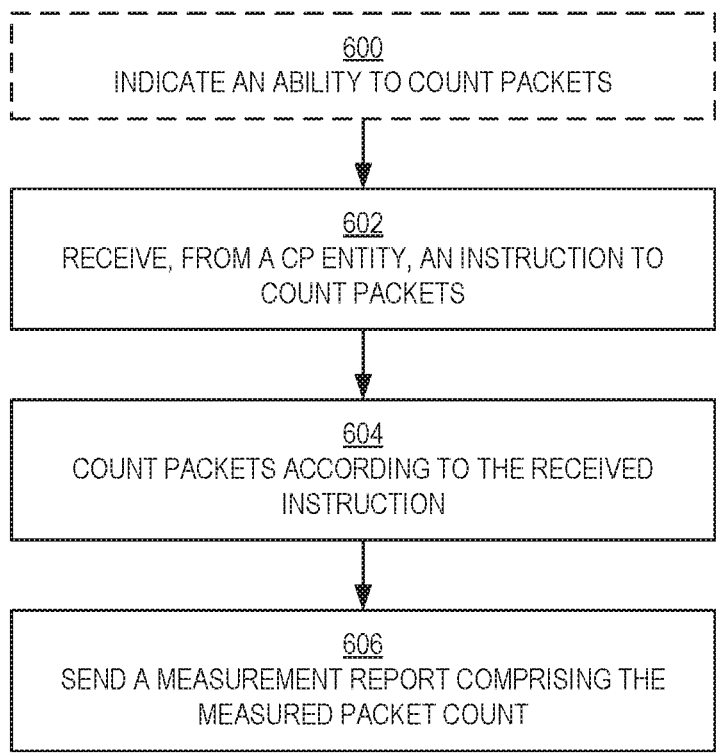
FIG. 6 illustrates a method for providing instructions to measure the number of packets in CUPS according to some embodiments of the present disclosure.

FIG. 6 illustrates a method for providing instructions to measure the number of packets in CUPS according to some embodiments of the present disclosure. In the embodiment illustrated in FIG. 6, the method includes performing the following steps at a UP function: indicate an ability to count packets or measure a number of packets (step 600); receive, from a CP entity, an instruction to count packets (step 602); count packets according to the received instruction (step (604); and send, to the CP entity or an alternative CP as indicated in the instruction, a measurement or usage report that comprises a packet count (step 606).

In some embodiments, step 600 is optional. For example, the ability of a particular UP entity to count packets may have previously been indicated by the UP entity or that ability and thus does not need to be repeated, or the ability to count packets may be indicated by an entity other than the UP entity.

For example, indicating the ability to measure number of packets comprises indicating support to the CP entity for the feature Measure Number Of Packets (MNOP) or other packet counting feature having a different name.

In some embodiments, receiving an instruction to count packets may include, but is not limited to, at least some of the procedures described in the "Instructing the UP entity" section, above.

In some embodiments, sending the usage report that comprises a packet count may include, but is not limited to, at least some of the procedures described in the "Receiving the packet count" section, above.

In some embodiments, for the volume-based measurement method, the CP function may provision: a Measurement Information with the 'Measurement Number of Packets' flag set to 1, to request the UP function to measure the number of packets be transferred in UL/DL/Total in addition to the measurement in octet, if the UP function supports the MNOP feature.

In some embodiments, for the volume-based measurement method, the UP function shall include all the counters (Total, Uplink and Downlink) of the URR in the Volume Measurement IE in the Usage Report IE, the UP function shall also include the number of packets counted for Total, Uplink, Downlink in the Volume Measurement IE if the CP function has requested and if the UP function supports MNOP feature.

In some embodiments, the Measurement Information IE shall be included when the following flag is set: Measurement Number of Packets Flag: this flag may be set to 1 when the Volume-based measurement applies, to request the UP function to report the number of packets in UL/DL/Total in addition to the measurement in octet.

In some embodiments, UP Function Features includes: UPF supports measurement of number of packets which is instructed with the flag 'Measurement Number of Packets' in a URR. See also 5.2.2.2.1.

In some embodiments, Volume Measurement IE contains the measured traffic volumes encoded as:

| Octets | Bits | | | | | | | |
|---|---|---|---|---|---|---|---|---|
| | 8 | 7 | 6 | 5 | 4 | 3 | 2 | 1 |
| 1 to 2 | Type = 66 (decimal) | | | | | | | |
| 3 to 4 | Length = n | | | | | | | |
| 5 | Spare | DLNOP | ULNOP | | TONOP | DLVOL | ULVOL | TOVOL |
| m to (m + 7) | Total Volume | | | | | | | |
| P to (p + 7) | Uplink Volume | | | | | | | |
| q to (q + 7) | Downlink Volume | | | | | | | |
| r to (r + 7) | Total Number of Packets | | | | | | | |
| s to (s + 7) | Uplink Number of Packets | | | | | | | |
| t to (t + 7) | Downlink Number of Packets | | | | | | | |
| z to (n + 4) | These octet(s) is/are present only if explicitly specified | | | | | | | |

In some embodiments, the following flags are coded within Octet 5:

Bit 1—TOVOL: If this bit is set to "1", then the Total Volume field shall be present, otherwise the Total Volume field shall not be present.

Bit 2—ULVOL: If this bit is set to "1", then the Uplink Volume field shall be present, otherwise the Uplink Volume field shall not be present.

Bit 3—DLVOL: If this bit is set to "1", then the Downlink Volume field shall be present, otherwise the Downlink Volume field shall not be present.

Bit 4 (or any capable bit such as "bit a")—TONOP: If this bit is set to "1", then the Total Number of Packets field shall be present, otherwise the Total Number of Packets field shall not be present.

Bit 5 (or any capable bit such as "bit b")—ULNOP: If this bit is set to "1", then the Uplink Number of Packets field shall be present, otherwise the Uplink Number of Packets field shall not be present.

Bit 6 (or any capable bit such as "bit c")—DLNOP: If this bit is set to "1", then the Downlink Number of Packets field shall be present, otherwise the Downlink Number of Packets field shall not be present.

Bit 7 to bit 8: Spare, for future use and set to 0.

The Total Number of Packets, Uplink Number of Packets and Downlink Number of Packets fields shall be encoded as an Unsigned64 binary integer value. They shall contain the total, uplink or downlink number of packets respectively.

In some embodiments, the Measurement Information IE is encoded as:

| Octets | Bits | | | | | | | |
|---|---|---|---|---|---|---|---|---|
| | 8 | 7 | 6 | 5 | 4 | 3 | 2 | 1 |
| 1 to 2 | Type = 100 (decimal) | | | | | | | |
| 3 to 4 | Length = n | | | | | | | |
| 5 | Spare | | | MNOP | ISTM | RADI | INAM | MBQE |
| 6 to (n + 4) | These octet(s) is/are present only if explicitly specified | | | | | | | |

In some embodiments, Octet 5 is encoded as follows:

Bit 1—MBQE (Measurement Before QoS Enforcement): when set to 1, this indicates a request to measure the traffic usage before QoS enforcement.

Bit 2—INAM (Inactive Measurement): when set to 1, this indicates that the measurement shall be paused (inactive).

Bit 3—RADI (Reduced Application Detection Information): when set to 1, this indicates that the Application Detection Information reported to the CP function, upon detecting the start or stop of an application, shall only contain the Application ID.

Bit 4—ISTM (Immediate Start Time Metering): when set to 1, this indicates that time metering shall start immediately when the flag is received.

Bit 5—MNOP (Measurement Number of Packets): when set to 1, this indicate a request to measure the number of packets transferred in UL/DL/Total in addition to the measurement in octets when Volume based measurement applies.

Bits 5 to 8: Spare, for future use and set to 0.

Figure 7:
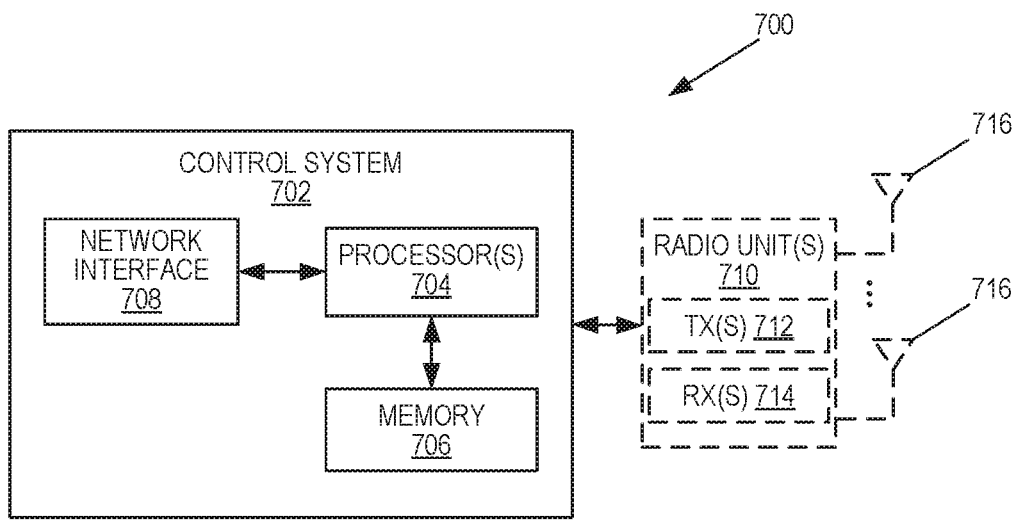
FIG. 7 is a schematic block diagram of a network node according to some embodiments of the present disclosure.

FIG. 7 is a schematic block diagram of a network node 700 according to some embodiments of the present disclosure. The network node 700 may be, for example, a radio access node, such as a base station 202 or 206, or a core network node, such as those illustrated in FIGS. 3 and 4. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry.

In addition, if the network node 700 is a radio access node, for example, it may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein. In some embodiments, the function(s) are implemented in software that is stored, e.g., in the memory 706 and executed by the one or more processors 704.

Figure 8:
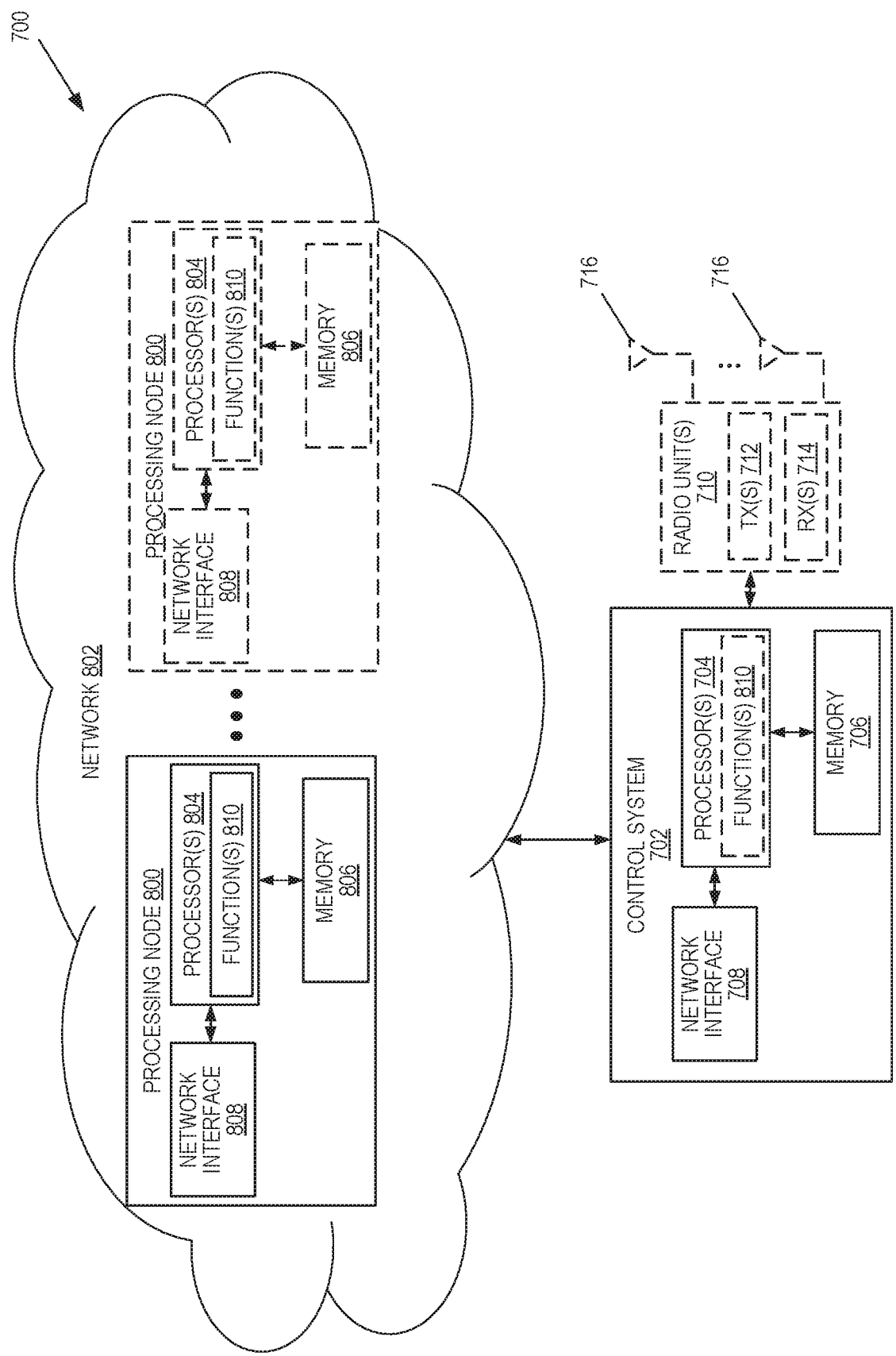
FIG. 8 is a schematic block diagram that illustrates a virtualized embodiment of the radio access node, according to some embodiments of the present disclosure.

FIG. 8 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" radio access node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes the control system 702 that includes the one or more processors 704 (e.g., CPUs, ASICs, FPGAs, and/or the like), the memory 706, and the network interface 708 and, optionally, the one or more radio units 710 that each includes the one or more transmitters 712 and the one or more receivers 714 coupled to the one or more antennas 716, as described above. The control system 702 may be connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the network node 700 described herein are implemented at the one or more processing nodes 800 or distributed across the control system 702 and the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
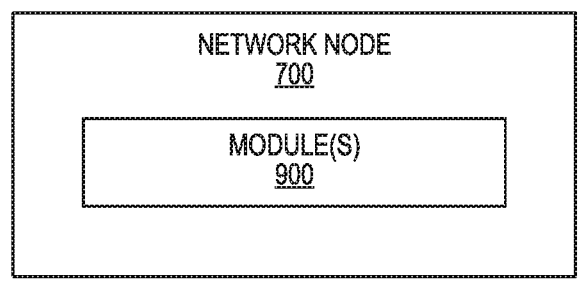
FIG. 9 is a schematic block diagram of the network node, according to some other embodiments of the present disclosure.

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
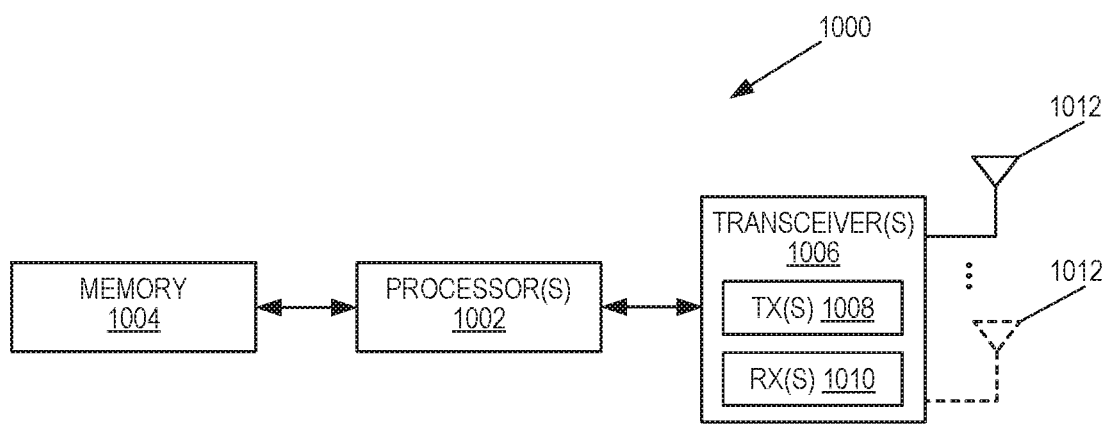
FIG. 10 is a schematic block diagram of a UE, according to some embodiments of the present disclosure.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
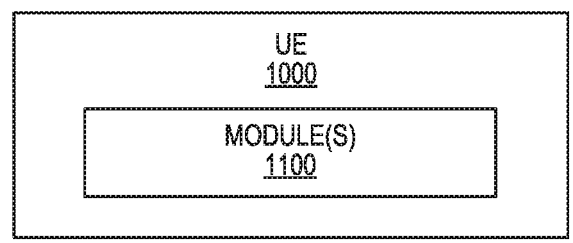
FIG. 11 is a schematic block diagram of the UE, according to some embodiments of the present disclosure.

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 12:
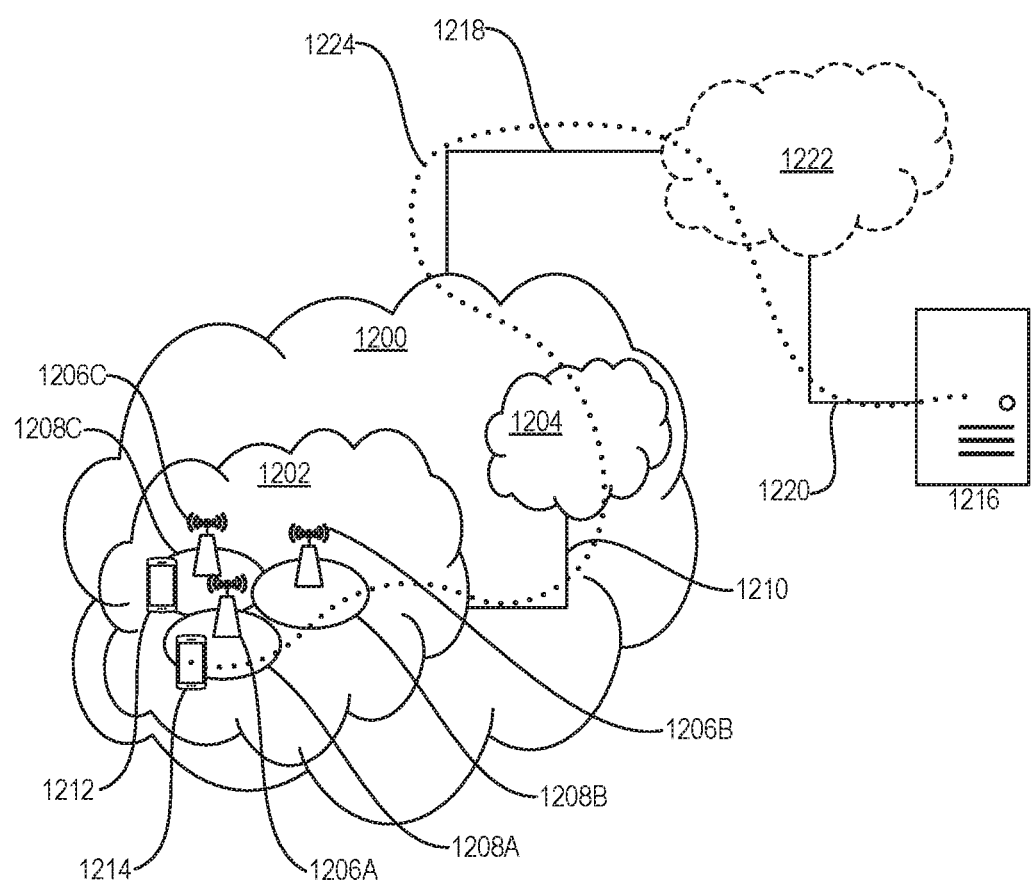
FIGS. 12 and 13 illustrate examples of a cellular communications system, according to some embodiments of the present disclosure.

FIG. 12 illustrates a telecommunication network according to some embodiments of the present disclosure. With reference to FIG. 12, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as Node Bs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Figure 13:
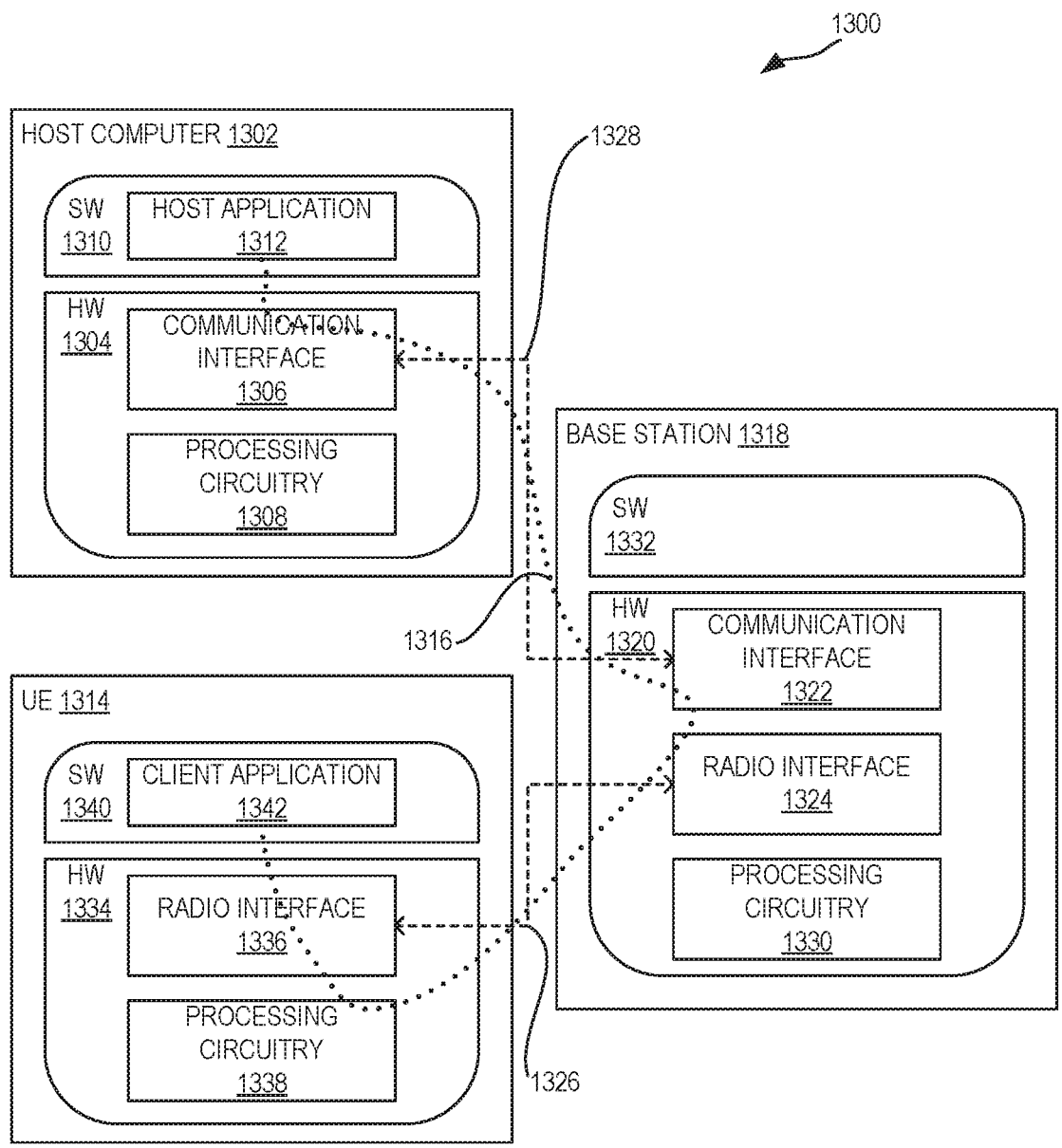

FIG. 13 illustrates a communication system according to some embodiments of the present disclosure. Example implementations, in accordance with an embodiment, of the UE, base station, and host computer discussed in the preceding paragraphs will now be described with reference to FIG. 13. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may provide for the ability to measure data usage in terms of packets and thereby provide benefits such as enhance the system's ability to derive a proper traffic model in the mobile network, which is vital for dimensioning and deployment.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

Figures 16, 17:
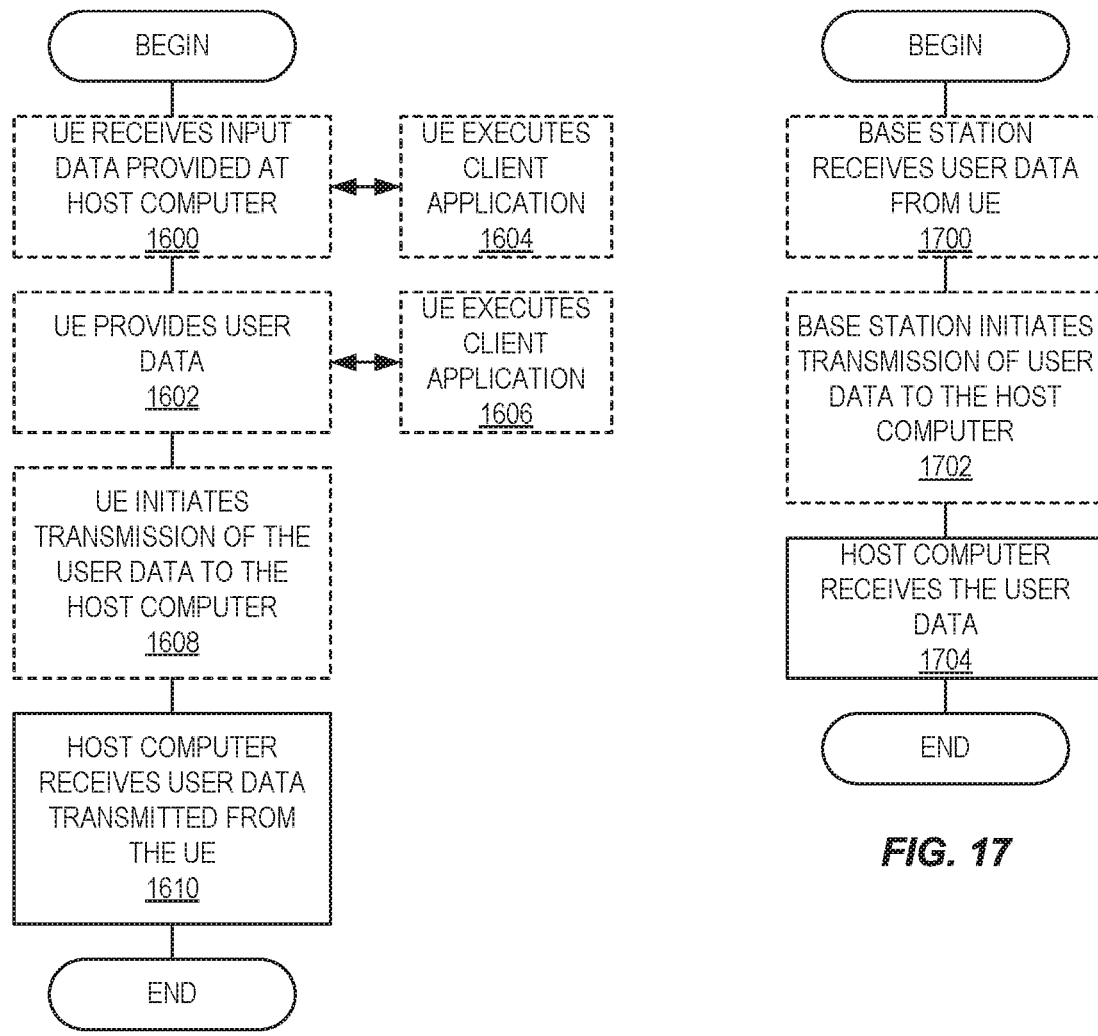

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Control Plane Entity Embodiments

Embodiment 1: A method performed by a Control Plane, CP, entity, the method comprising: determining (500) that packet counting should be performed by a User Plane, UP, entity; providing measurement instructions (502) to the UP entity for counting packets and identifying a recipient of a packet count if the CP entity is not the recipient; and if the CP entity is the recipient of the packet count, receiving (504), from the UP entity, a packet count.

=Determining that Packets should be Counted

= . . . UP Driven

Embodiment 2: The method of embodiment 1 wherein determining (500) that packet counting should be performed comprises receiving, from the UP entity, an indication that packet counting is supported.

Embodiment 3: The method of embodiment 2 wherein receiving an indication that packet counting is supported comprises receiving the indication during establishment or update of a Packet Flow Control Protocol, PFCP, association.

Embodiment 4: The method of embodiment 3 wherein the indication comprises the capability for the UP entity to perform packet count measurement based on at least one of a UE, Protocol Data Unit, PDU, session, a Packet Data Network, PDN, connection, an Access Point Name, APN, or Data Network Name, DNN, and/or a service data flow.

Embodiment 5: The method of embodiment 3, wherein the indication further comprises the capability of the UP entity to provide packet based measurement and octet based measurement.

= . . . UE Subscription Driven

Embodiment 6: The method of embodiment 1 wherein determining (500) that packet count measurement should be performed comprises receiving subscription information for a User Equipment, UE, the subscription information comprising an indication that packet count measurement should be performed for an identified Data Network Name, DNN, or Access Point Name, APN, an application, or a Protocol Data Unit, PDU, session or Packet Data Network, PDN, connection associated with an established PFCP session.

Embodiment 7: The method of embodiment 6 wherein the subscription information is received from a Unified Data Management, UDM, entity, a Home Subscriber Server, HSS, or an Authentication, Authorization, and Access, AAA, server.

= . . . PCF Driven

Embodiment 8: The method of embodiment 1 wherein determining (500) that packet counting should be performed comprises receiving, from a Policy and Charging Control Function, PCF, a policy rule indicating that packet counting should be performed for an identified service data flow or for a UE or for a PDU session/PDN connection or for an application.

= . . . CP Driven

Embodiment 9: The method of embodiment 1 wherein determining (500) that packet counting should be performed comprises determining that a configuration of the CP function indicates the need to indicate to the UP function that packet count measurement is to be reported.

=Instructing the UP Entity

Embodiment 10: The method of embodiment 1 wherein instructing (502) the UP entity to count packets comprises instructing a UP Function, UPF, to count packets.

Embodiment 11: The method of embodiment 1 wherein instructing (502) the UP entity to count packets comprises provisioning the UP entity with a Usage Reporting Rule, URR, to count the number of packets, and a Packet Detection Rule, PDR, which is associated with the URR, comprising information to identify the packets to be counted.

Embodiment 12: The method of embodiment 11 wherein the information identifying packets to be counted comprises information identifying a UE, a Protocol Data Unit, PDU, session, a Packet Data Network, PDN, connection, an APN/DNN, an application, and/or a service data flow.

Embodiment 13: The method of embodiment 11 wherein the information identifying packets to be counted indicates that Uplink, UL, packets should be counted, that Downlink, DL, packets should be counted, and/or that both UL and DL packets should be counted.

Embodiment 14: The method of embodiment 1 wherein instructing (502) the UP entity to count packets comprises sending an Information Element, IE, that conveys measurement instructions.

Embodiment 15: The method of embodiment 1 wherein the measurement instructions indicate that the measurement method is to count packets.

Embodiment 16: The method of embodiment 15 further comprising providing a reporting trigger based on a packet count threshold.

Embodiment 17: The method of embodiment 1 or 16, wherein identifying the recipient comprises indicating a URI for sending the packet count measurement reports.

=Receiving the Packet Count

Embodiment 18: The method of embodiment 1 wherein receiving (504) the packet count comprises receiving a usage report comprising the packet count in accordance with the measurement instructions.

Embodiment 19: The method of embodiment 18 wherein receiving a usage report comprising the packet count comprises receiving a usage report comprising the packet count within the Information Element, IE, that conveys volume measurement.

Embodiment 20: The method of embodiment 18 wherein receiving a usage report comprising the packet count comprises receiving a usage report comprising the packet count within a new Information Element, IE, that conveys packet measurement.

Embodiment 21: The method of embodiment 16 and 20 wherein the usage report comprises the reporting trigger and may comprise the packet count threshold.

User Plane Entity Embodiments

Embodiment 22: A method performed by a User Plane, UP, entity, the method comprising: receiving (602), from a Control Plane, CP, entity, an instruction to perform packet count measurement and an identity of a recipient of a packet count; counting (604) packets according to the received instruction; and sending (606), at least one measurement report comprising the measured packet count to the identified recipient.

=Indicating an Ability

Embodiment 23: The method of embodiment 22 comprising, prior to receiving the instruction to count packets, directly or indirectly indicating (600) to the CP function an ability to count packets.

Embodiment 24: The method of embodiment 23 wherein indicating (600) an ability to count packets comprises indicating support for the feature Measure Number Of Packets, MNOP, or other packet counting feature having a different name.

=Receiving an Instruction

Embodiment 25: The method of embodiment 22 wherein receiving (602) an instruction to count packets comprises receiving a Usage Report Rule, URR, to count the number of packets, and a Packet Detection Rule, PDR, which is associated with the URR, comprising information to identify the packets to be counted.

Embodiment 26: The method of embodiment 25 wherein the information identifying packets to be counted comprises information identifying a UE, Protocol Data Unit, PDU, session, a Packet Data Network, PDN, connection, an Access Point Name, APN, or Data Network Name, DNN, an application, and/or a service data flow.

Embodiment 27: The method of embodiment 25 wherein the information identifying packets to be counted indicates that Uplink, UL, packets should be counted, that Downlink, DL, packets should be counted, and/or that both UL and DL packets should be counted.

Embodiment 28: The method of embodiment 22 wherein receiving (602) an instruction to count packets comprises receiving a flag that is included in an Information Element, IE, that conveys measurement information.

Embodiment 29: The method of embodiment 28 wherein the flag indicates that the measurement method is to count packets.

Embodiment 30: The method of embodiment 22 wherein receiving (602) an instruction to count packets further comprises receiving a reporting trigger based on a packet count threshold.

Embodiment 31: The method of embodiment 22 or 30, wherein receiving the instruction comprises receiving a URI for where to send the packet count measurement reports/Usage reports.

=Counting Packets

Embodiment 32: The method of embodiment 22 wherein counting (604) packets according to the received instruction comprises counting packets identified by the received instruction from the CP entity.

Embodiment 33: The method of embodiment 32 wherein counting packets identified by the received instruction comprises counting packets associated with an identified UE, application, PDU session, PDN connection, APN/DNN, and/or a service data flow.

Embodiment 34: The method of embodiment 32 wherein counting packets identified by the received instruction comprises counting UL and/or DL packets and/or Total packets as specified by the received instruction.

=Sending

Embodiment 35: The method of embodiment 22 wherein sending (606) a packet count comprises sending a packet count measurement in an IE included in the usage report that comprises the packet count.

Embodiment 36: The method of embodiment 22 wherein the IE is Volume Measurement or Packet Measurement.

Embodiment 37: The method of embodiment 31 and 35 wherein the usage report that comprises the packet count are sent to the URI provided in the instruction.

Apparatus Embodiments

Embodiment 38: A Control Plane, CP, entity (700) comprising: processing circuitry configured to perform any of the steps of any of the Control Plane Entity embodiments; and power supply circuitry configured to supply power to the wireless device.

Embodiment 39: The CP entity of embodiment 38, the CP entity comprising a Signaling Gateway Control plane function, SGW-C, a Packet Gateway Control plane function, PGW-C, a Traffic Detection Function Control plane function, TDF-C, and/or a Session Management Function, SMF.

Embodiment 40: A User Plane, UP, entity (700) comprising: processing circuitry configured to perform any of the steps of any of the User Plane Entity embodiments; and power supply circuitry configured to supply power to the base station.

Embodiment 41: The UP entity of embodiment 40, the UP entity comprising a Signaling Gateway User plane function, SGW-U, a Packet Gateway User plane function, PGW-U, a Traffic Detection Function User plane function, TDF-U, and/or a User Plane Function, UPF.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AAA Authentication, Authorization, and Access
AF Application Function
AMF Access and Mobility Function
AN Access Network
AP Access Point
ASIC Application Specific Integrated Circuit
AUSF Authentication Server Function
CHF Charging Function
CIoT Cellular Internet of Things
CP Control Plane
CPU Central Processing Unit
CUPS Control/User Plane Separation
DL Downlink
DN Data Network
DNN Data Network Name
DSP Digital Signal Processor
eNB Enhanced or Evolved Node B
EPC Evolved Packet Core
EPS Evolved Packet System
FPGA Field Programmable Gate Array
gNB New Radio Base Station
HSS Home Subscriber Server
IE Information Element
INAM Inactive Measurement
IoT Internet of Things
IP Internet Protocol
ISTM Immediate Start Time Metering
LTE Long Term Evolution
MBQE Measurement Before QoS Enforcement MME Mobility Management Entity
MNOP Measure Number of Packets
MTC Machine Type Communication
NEF Network Exposure Function
NF Network Function
NR New Radio
NRF Network Function Repository Function
NSSF Network Slice Selection Function
OCS Online Charging System
OTT Over-the-Top
PCF Policy Control Function
PDN Packet Data Network
PDR Packet Detection Rule
PDU Protocol Data Unit
PFCP Packet Flow Control Protocol
P-GW Packet Data Network Gateway
PGW-C Packet Gateway Control Plane Function
PGW-U Packet Gateway User Plane Function
QoS Quality of Service
RADI Reduced Application Deduction Information
RAM Random Access Memory
RAN Radio Access Network
ROM Read Only Memory
RRH Remote Radio Head
RTT Round Trip Time
SCEF Service Capability Exposure Function
SDF Service Data Flow
SGW Signalling Gateway
SGW-C Signalling Gateway Control Plane Function
SGW-U Signalling Gateway User Plane Function
SMF Session Management Function
TDF-C Traffic Detection Function Control Plane Function
TS Technical Specification
UDM Unified Data Management
UE User Equipment
UL Uplink
UP User Plane
UPF User Plane Function
URI Uniform Resource Identifier
URR Usage Reporting Rule Those skilled in the art will recognize improvements and modifications to the embodiments of the present disclosure. All such improvements and modifications are considered within the scope of the concepts disclosed herein.

What is claimed is:

1. A method performed by a Control Plane, CP, entity, the method comprising:
   receiving an indication from a User Plane, UP, entity that a feature Measure Number Of Packets, MNOP, is supported;
   determining that packet counting should be performed by the UP entity;
   providing measurement instructions to the UP entity for counting packets and identifying a recipient of a packet count if the CP entity is not the recipient; and
   if the CP entity is the recipient of the packet count, receiving, from the UP entity, the packet count.

2. The method of claim 1 wherein receiving the indication t comprises:
   receiving the indication during establishment or update of a Packet Flow Control Protocol, PFCP, association.

3. The method of claim 2 wherein the indication comprises a capability for the UP entity to perform packet count measurement based on at least one of: a UE, Protocol Data Unit, PDU, session; a Packet Data Network, PDN, connection; an Access Point Name, APN, or Data Network Name, DNN; and a service data flow.

4. The method of claim 2, wherein the indication further comprises a capability of the UP entity to provide packet based measurement and octet based measurement.

5. The method of claim 1 wherein determining that packet count measurement should be performed comprises:
   receiving subscription information for a User Equipment, UE, the subscription information comprising an indication that the packet count measurement should be performed for at least one of: an identified Data Network Name, DNN, or Access Point Name, APN; an application; a Protocol Data Unit, PDU, session; and a Packet Data Network, PDN, connection associated with an established Packet Flow Control Protocol, PFCP, session.

6. The method of claim 5 wherein the subscription information is received from at least one of: a Unified Data Management, UDM, entity; a Home Subscriber Server, HSS; and an Authentication, Authorization, and Access, AAA, server.

7. The method of claim 1 wherein determining that the packet counting should be performed comprises:
   receiving, from a Policy and Charging Control Function, PCF, a policy rule indicating that the packet counting should be performed for an identified service data flow or for a User Equipment, UE, or for a Protocol Data Unit, PDU, session/Packet Data Network, PDN, connection or for an application.

8. The method of claim 1 wherein determining that the packet counting should be performed comprises:
   determining that a configuration of a CP function indicates a need to indicate to a UP function that packet count measurement is to be reported.

9. The method of claim 1 wherein instructing the UP entity to count packets comprises instructing a UP Function, UPF, to count packets.

10. The method of claim 1 wherein instructing the UP entity to count the packets comprises: provisioning the UP entity with a Usage Reporting Rule, URR, to count the number of the packets, and a Packet Detection Rule, PDR, which is associated with the URR, comprising information to identify the packets to be counted.

11. The method of claim 10 wherein the information identifying packets to be counted comprises at least one of: information identifying the UE; the Protocol Data Unit, PDU, session; the Packet Data Network, PDN, connection; the APN/DNN; the application; and the service data flow.

12. The method of claim 10 wherein the information identifying the packets to be counted indicates at least one of: that Uplink, UL, packets should be counted; that Downlink, DL, packets should be counted; and that both the UL and DL packets should be counted.

13. The method of claim 1 wherein instructing the UP entity to count the packets comprises sending an Information Element, IE, that conveys measurement instructions.

14. The method of claim 1 wherein the measurement instructions indicate that the measurement method is to count the packets.

15. The method of claim 14 further comprising: providing a reporting trigger based on a packet count threshold.

16. The method of claim 1, wherein identifying the recipient comprises: indicating a Uniform Resource Identifier, URI, for sending packet count measurement reports.

17. The method of claim 1, wherein receiving the packet count comprises: receiving a usage report comprising the packet count in accordance with the measurement instructions.

18. The method of claim 17 wherein receiving the usage report comprising the packet count comprises receiving the usage report comprising the packet count within an Information Element, IE, that conveys volume measurement.

19. The method of claim 17 wherein receiving the usage report comprising the packet count comprises: receiving the usage report comprising the packet count within a new Information Element, IE, that conveys packet measurement.

20. The method of claim 15 wherein the usage report comprises at least one of: the reporting trigger; and the packet count threshold.

21. A method performed by a User Plane, UP, entity, the method comprising:
sending an indication to a Control Plane, CP, entity that a feature Measure Number Of Packets, MNOP, is supported by the UP entity;
receiving, from the CP entity, an instruction to perform packet count measurement and an identity of a recipient of a packet count;
counting packets according to the received instruction; and
sending, at least one measurement report comprising the measured packet count to the identified recipient.

22. The method of claim 21 wherein receiving the instruction to count packets comprises:
receiving a Usage Report Rule, URR, to count a number of packets, and a Packet Detection Rule, PDR, which is associated with the URR, comprising information to identify the packets to be counted.

23. The method of claim 22 wherein the information identifying packets to be counted comprises at least one of: information identifying a UE, Protocol Data Unit, PDU, session; a Packet Data Network, PDN, connection; an Access Point Name, APN; a Data Network Name, DNN; an application; and a service data flow.

24. The method of claim 22 wherein the information identifying packets to be counted indicates at least one of: that Uplink, UL, packets should be counted; that Downlink, DL, packets should be counted; and that both the UL and DL packets should be counted.

25. The method of claim 21 wherein receiving the instruction to count the packets comprises: receiving a flag that is included in an Information Element, IE, that conveys measurement information.

26. The method of claim 25 wherein the flag indicates that a measurement method is to count the packets.

27. The method of claim 21 wherein receiving the instruction to count the packets further comprises receiving a reporting trigger based on a packet count threshold.

28. The method of claim 21, wherein receiving the instruction comprises receiving a Uniform Resource Identifier, URI, for where to send the packet count measurement reports/Usage reports.

29. The method of claim 22 wherein counting the packets according to the received instruction comprises counting the packets identified by the received instruction from the CP entity.

30. The method of claim 29 wherein counting the packets identified by the received instruction comprises counting the packets associated with at least one of: the identified UE, the application; the PDU session; the PDN connection, the APN/DNN; and the service data flow.

31. The method of claim 29 wherein counting the packets identified by the received instruction comprises counting the UL and/or DL packets and/or Total packets as specified by the received instruction.

32. The method of claim 21 wherein sending the packet count comprises: sending the packet count measurement in the IE included in the usage report that comprises the packet count.

33. The method of claim 21 wherein the IE is Volume Measurement or Packet Measurement.

34. The method of claim 28 wherein the usage report that comprises the packet count are sent to the URI provided in the instruction.

35. A Control Plane, CP, entity comprising:
processing circuitry configured to cause the CP entity to:
receive an indication from a User Plane, UP, entity that a feature Measure Number of Packets, MNOP, is supported;
determine that packet counting should be performed by the UP entity;
provide measurement instructions to the UP entity for counting packets and identifying a recipient of a packet count if the CP entity is not the recipient; and
if the CP entity is the recipient of the packet count, receive, from the UP entity, the packet count; and
power supply circuitry configured to supply power to a wireless device.

36. The CP entity of claim 35, comprising at least one of: a Signaling Gateway Control plane function, SGW-C; a Packet Gateway Control plane function, PGW-C; a Traffic Detection Function Control plane function, TDF-C; and a Session Management Function, SMF.

37. A User Plane, UP, entity comprising:
processing circuitry configured to cause the UP entity to:
send an indication to a Control Plane, CP, entity that a feature Measure Number of Packets, MNOP, is supported by the UP entity;
receive, from the CP entity, an instruction to perform packet count measurement and an identity of a recipient of a packet count;
count packets according to the received instruction; and
send, at least one measurement report comprising the measured packet count to the identified recipient; and
power supply circuitry configured to supply power to a base station.

38. The UP entity of claim 37, comprising at least one of: a Signaling Gateway User plane function, SGW-U; a Packet Gateway User plane function, PGW-U; a Traffic Detection Function User plane function, TDF-U; and a User Plane Function, UPF.

* * * * *

UNITED STATES PATENT AND TRADEMARK OFFICE
CERTIFICATE OF CORRECTION

PATENT NO. : 12,040,983 B2  
APPLICATION NO. : 17/634261  
DATED : July 16, 2024  
INVENTOR(S) : Yang et al.

Page 1 of 1

It is certified that error appears in the above-identified patent and that said Letters Patent is hereby corrected as shown below:

In the Specification

In Column 7, Line 14, delete "Access and Mobility Function (AMF)," and insert -- Access and Mobility Management Function (AMF), --, therefor.

In Column 11, Line 41, delete "Authentication, Authorization, and Access (AAA)" and insert -- Authentication, Authorization and Accounting (AAA) --, therefor.

In Column 21, Line 61, delete "Authentication, Authorization, and Access," and insert -- Authentication, Authorization and Accounting, --, therefor.

In Column 24, Line 39, delete "Authentication, Authorization, and Access" and insert -- Authentication, Authorization and Accounting --, therefor.

In Column 24, Line 41, delete "Access and Mobility Function" and insert -- Access and Mobility Management Function --, therefor.

In the Claims

In Column 26, Line 19, in Claim 6, delete "Authentication, Authorization, and Access," and insert -- Authentication, Authorization and Accounting, --, therefor.

Signed and Sealed this  
Eighteenth Day of February, 2025

Coke Morgan Stewart  
*Acting Director of the United States Patent and Trademark Office*